(12) United States Patent
Doora PrabhuSwamy

(10) Patent No.: US 9,027,092 B2
(45) Date of Patent: May 5, 2015

(54) TECHNIQUES FOR SECURING DATA ACCESS

(75) Inventor: Kiran Prabhu Doora PrabhuSwamy, Mysore (IN)

(73) Assignee: Novell, Inc., Provo, UT (US)

( * ) Notice: Subject to any disclaimer, the term of this patent is extended or adjusted under 35 U.S.C. 154(b) by 749 days.

(21) Appl. No.: 12/604,805

(22) Filed: Oct. 23, 2009

(65) Prior Publication Data

US 2011/0099610 A1   Apr. 28, 2011

(51) Int. Cl.
| G06F 21/62 | (2013.01) |
|---|---|
| H04L 9/08 | (2006.01) |
| H04L 9/32 | (2006.01) |
| G06F 17/30 | (2006.01) |
| H04N 1/44 | (2006.01) |
| G06F 17/00 | (2006.01) |
| G06F 7/00 | (2006.01) |
| H04N 5/913 | (2006.01) |

(52) U.S. Cl.
CPC ............ *G06F 21/6218* (2013.01); *G06F 17/30* (2013.01); *H04N 1/448* (2013.01); *G06F 17/60* (2013.01); *G06F 7/00* (2013.01); *H04N 5/913* (2013.01); *G06F 2221/2107* (2013.01); *H04L 9/085* (2013.01); *H04L 9/0894* (2013.01); *H04L 9/3271* (2013.01)

(58) Field of Classification Search
CPC . H04N 1/448; H04N 5/913; H04N 19/00927; H04N 21/235; G06F 7/00; G06F 21/6218; G06F 17/30; G06F 17/60; H04L 1/448
USPC .................................. 726/5; 709/203; 705/51
See application file for complete search history.

(56) References Cited

U.S. PATENT DOCUMENTS

| 5,301,018 | A | * | 4/1994 | Smidth et al. ............ 375/240.24 |
|---|---|---|---|---|
| 5,425,102 | A | * | 6/1995 | Moy ............................ 713/183 |
| 5,805,674 | A | * | 9/1998 | Anderson, Jr. ............. 379/93.03 |
| 6,704,797 | B1 | * | 3/2004 | Fields et al. .................. 709/246 |
| 7,099,469 | B2 | * | 8/2006 | Kuhlman et al. ............... 380/28 |
| 7,119,980 | B2 |  | 10/2006 | Bandic et al. |
| 7,260,216 | B2 | * | 8/2007 | Carroll ........................... 380/28 |
| 7,346,927 | B2 |  | 3/2008 | Hillmer |
| 7,373,523 | B1 |  | 5/2008 | Moritz |
| 7,383,462 | B2 |  | 6/2008 | Osaki et al. |
| 7,412,603 | B2 |  | 8/2008 | Yeates et al. |
| 7,428,752 | B2 |  | 9/2008 | Rutherglen et al. |
| 7,434,263 | B2 |  | 10/2008 | Lampson et al. |
| 7,464,411 | B2 | * | 12/2008 | Heylen ............................ 726/30 |
| 7,519,830 | B2 |  | 4/2009 | Mihm, Jr. et al. |

(Continued)

FOREIGN PATENT DOCUMENTS

EP   1832996 A1 *   9/2007

*Primary Examiner* — O. C. Vostal

(74) *Attorney, Agent, or Firm* — Schwegman Lundberg & Woessner, P.A.

(57) ABSTRACT

Techniques for securing data access are presented. A user's data is encrypted on multiple servers throughout a network. Each portion of the encrypted data resides on a different server, and each portion represents a non-contiguous data selection from the user's original unencrypted data. Each portion encrypted using a master credential that is different from the user's logon credential. Also, each portion encrypted using a server identity for the server on which that portion resides. An order, which is used for assembling decrypted versions of the encrypted portions back into the user's data, is acquired via another and different principal-supplied credential.

16 Claims, 3 Drawing Sheets

(56) References Cited

U.S. PATENT DOCUMENTS

| | | |
|---|---|---|
| 7,523,086 B1 | 4/2009 | Teague et al. |
| 7,543,336 B2 | 6/2009 | Lampson et al. |
| 7,574,735 B2 | 8/2009 | Pirttimaa et al. |
| 7,739,381 B2* | 6/2010 | Ignatius et al. ............... 709/225 |
| 8,826,397 B2* | 9/2014 | Sheets et al. ...................... 726/6 |
| 2002/0082997 A1* | 6/2002 | Kobata et al. .................. 705/51 |
| 2002/0099955 A1* | 7/2002 | Peled et al. .................... 713/200 |
| 2002/0107877 A1* | 8/2002 | Whiting et al. ............... 707/204 |
| 2003/0016302 A1* | 1/2003 | Fudge et al. ................... 348/441 |
| 2004/0030921 A1* | 2/2004 | Aldridge et al. .............. 713/200 |
| 2004/0086027 A1* | 5/2004 | Shattil ............................ 375/146 |
| 2006/0005017 A1* | 1/2006 | Black et al. .................... 713/165 |
| 2006/0053077 A1* | 3/2006 | Mourad et al. .................. 705/51 |
| 2006/0218396 A1* | 9/2006 | Laitinen et al. ............... 713/167 |
| 2006/0282864 A1* | 12/2006 | Gupte ............................. 725/89 |
| 2007/0067332 A1* | 3/2007 | Gallagher et al. ............ 707/102 |
| 2007/0107064 A1* | 5/2007 | Kitani et al. .................... 726/27 |
| 2007/0110391 A1* | 5/2007 | MacInnis ........................ 386/68 |
| 2007/0182986 A1* | 8/2007 | Ciriza et al. .................. 358/1.15 |
| 2007/0208824 A1* | 9/2007 | Ullman et al. ................. 709/217 |
| 2007/0255846 A1* | 11/2007 | Wee et al. ...................... 709/231 |
| 2008/0063105 A1* | 3/2008 | Gu et al. ........................ 375/265 |
| 2008/0270437 A1* | 10/2008 | Kahn et al. .................... 707/101 |
| 2008/0288785 A1* | 11/2008 | Rao et al. ....................... 713/190 |
| 2008/0301057 A1* | 12/2008 | Oren ................................ 705/71 |
| 2009/0024601 A1* | 1/2009 | Zmolek ............................. 707/4 |
| 2009/0132815 A1* | 5/2009 | Ginter et al. .................. 713/164 |
| 2009/0202065 A1* | 8/2009 | Majima ........................... 380/28 |
| 2009/0222509 A1* | 9/2009 | King et al. ..................... 709/203 |
| 2010/0125464 A1* | 5/2010 | Gross et al. ...................... 705/4 |
| 2010/0161926 A1* | 6/2010 | Li et al. .......................... 711/163 |
| 2010/0223558 A1* | 9/2010 | Feng .............................. 715/741 |
| 2010/0228987 A1* | 9/2010 | Dinov ............................ 713/183 |
| 2010/0313039 A1* | 12/2010 | Ignatius et al. ............... 713/189 |
| 2011/0093939 A1* | 4/2011 | Barbour et al. .................. 726/7 |
| 2011/0106957 A1* | 5/2011 | Ribot ............................. 709/229 |
| 2011/0222687 A1* | 9/2011 | Mori ............................. 380/200 |
| 2011/0302634 A1* | 12/2011 | Karaoguz et al. ................ 726/4 |

* cited by examiner

TECHNIQUES FOR SECURING DATA ACCESS

BACKGROUND

Electronic information is becoming the lifeblood of enterprises and individuals. Information is stored for virtually all aspects of one's life and all transactions that an enterprise engages in. This information is often indexed and stored in directories and/or databases in network repositories.

Information that is considered confidential to an individual or an enterprise is often stored behind a firewall and accessed via an authentication mechanism; the authentication mechanism is usually an identifier and a password combination (login access credential).

In most cases, if a login access credential is compromised, then all data associated with that particular user becomes compromised. That is, if a rogue individual can gain access to a user password or even change a user password to one that the rogue individual knows, then that rogue individual can gain access to all the user data housed in the environment that rogue individual compromised.

One solution used in the industry is to encrypt data with a key, requiring a user to also supply the key to gain access to the data. The problem with this approach is that if the key is compromised then all the data of the user becomes compromised. So, this is only slightly better than having a user's login credential compromised.

Thus, what are needed are improved techniques for securing access to data.

SUMMARY

In various embodiments, techniques for securing data access are presented. More specifically, and in an embodiment, a method for securing data access is provided. That is, server-controlled data for a principal is segmented into a first portion for a first server and a second portion for a second server. Each of the first and second portions represents non-contiguous data selections from the server controlled data. The first portion is encrypted using a master credential and a first server identity for the first server to produce an encrypted first portion and then the first portion is stored on the first server. The second portion is encrypted using the master credential and a second server identity for the second server to produce an encrypted second portion and then the second portion is stored on the second server. Finally, a second credential is created that is distributed to the principal; the second credential identifies an order for assembling a decrypted version of the encrypted first portion from the first server with a decrypted version of the encrypted second portion from the second server for purposes of recreating the server-controlled data.

DETAILED DESCRIPTION

As used herein a "principal" refers a user, network resource, or an automated service that processes as instructions on a processing device. Principals are authenticated via an "identity" for access to secure network services.

An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a principal across any context that the principal may engage in over a network (e.g., Internet, Intranet, etc.). However, each principal may have and manage a variety of identities, where each of these identities may only be unique within a given context (given service interaction, given processing environment, given virtual processing environment, etc.).

A "credential" is identifying information used with an authentication mechanism to establish, authenticate, and set an identity for a principal during a given session with a secure service. Again, the credential can include a digital certificate, digital signature, assertion, identifier and password combination, etc.

The term "session" refers to an online interactive, dynamic, and real time set of communications between one or more principals.

According to an embodiment, the techniques presented herein are implemented in proxy-server products, directory-based products, storage-access based products, and/or operating-system products, distributed by Novell, Inc. of Provo, Utah.

Of course, the embodiments of the invention can also be implemented in a variety of products and/or devices. Any particular architectural layout or implementation presented herein is provided for purposes of illustration and comprehension only and is not intended to limit various aspects of the invention.

Figure 1:
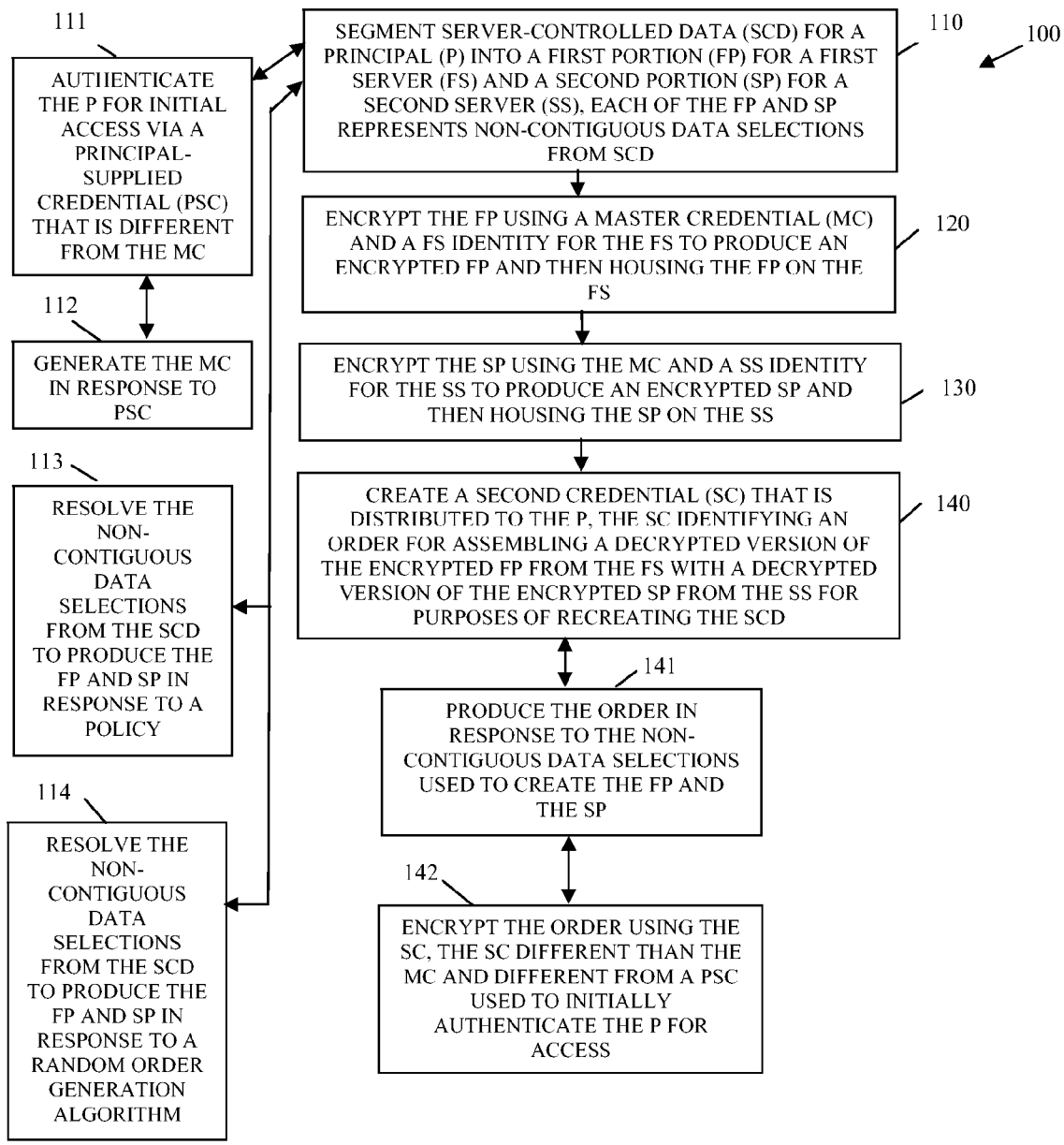
FIG. 1 is a diagram of a method for securing data access, according to an example embodiment.
Figure 2:
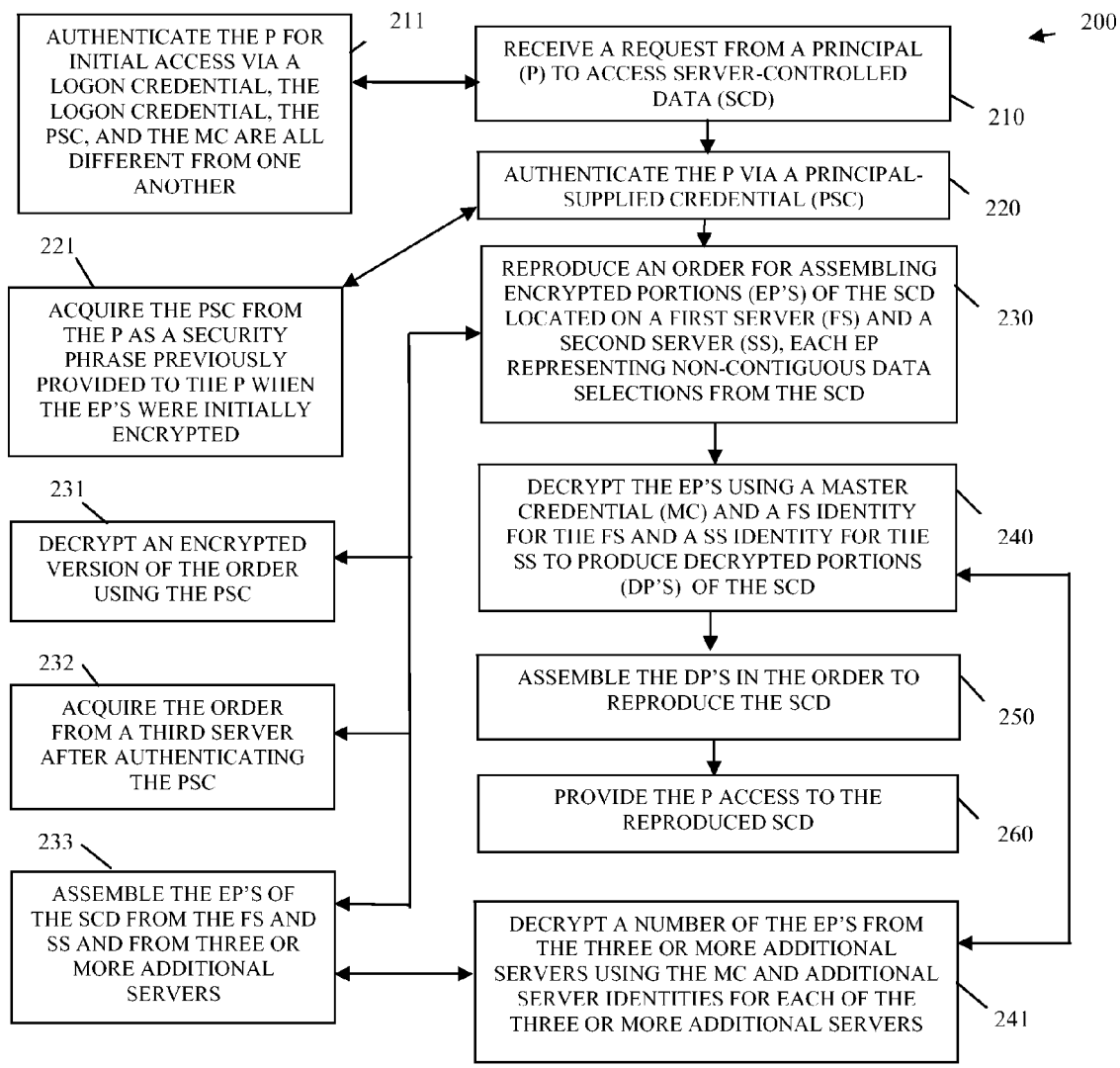
FIG. 2 is a diagram of another method for securing data access, according to an example embodiment.
Figure 3:
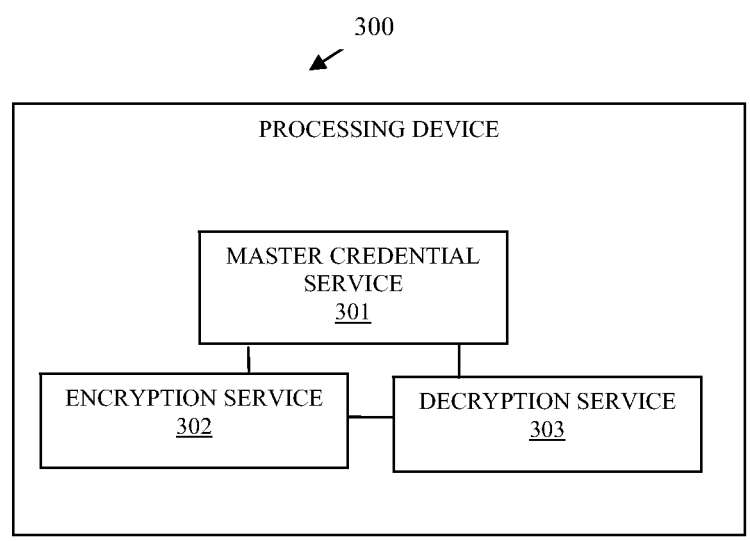
FIG. 3 is a diagram of a data access security system, according to an example embodiment.

It is within this initial context, that various embodiments of the invention are now presented with reference to the FIGS. 1-3.

FIG. 1 is a diagram of a method 100 for securing data access, according to an example embodiment. The method 100 (hereinafter "data securing service") is implemented as instructions in a machine-accessible and/or computer-readable storage medium. The instructions when executed by a machine (processing device, computer, etc.) perform the processing depicted in FIG. 1. The data securing service is also operational over and processes within communication network. The network may be wired, wireless, or a combination of wired and wireless.

In some cases, a processing device (one or more processors) is specifically configured to execute the instructions representing the data securing service.

At 110, data securing service segments server-controlled data for a principal into a first portion for a first server and a second portion for a second server. Each of the first and second portions represents non-contiguous data selections from the server controlled data.

The server-controlled data is electronic information that is controlled or owned by the principal. That is, the principal's information is being managed for the principal as the server-controlled data by the data securing service.

Also, as discussed herein and below, the first and second servers are separate processing devices. In one instance, the first and second servers are located externally from one another over a network, such as a wide-area network (WAN). In another case, the first and second servers are located externally from one another over a local-area network (LAN), such as within an Intranet or within a firewall. In still another situation, the first and second servers are logically located externally from one another as different virtual machines located on a same physical machine.

The phrase "non-contiguous data selections" is intended to mean that the normal sequential and temporal nature of data, which is associated with user data sets/files, does not occur. For example, if a dataset is identified as a document that includes data, which would be read as "ABCD," then non-contiguous data selections can include any two or more sets of portions of that data where the data is mixed up from its normal created order, such as "AC" and "BD." In this example, the first portion is "AC" and it is stored on the first server; the second portion is "BD" and it is stored on the second server.

So, "non-contiguous data selections" means that the normal created order for the server controlled data is scrambled in a different order, which can be recreated under certain defined conditions identified herein and below in greater detail. In this manner should a rogue intruder gain access to the first portion and the second portion, the intruder would still not be able to recreate the proper order for the server-controlled data to make it useful to the intruder.

According to an embodiment, at 111, the data securing service also authenticates the principal for initial access to the processing environment associated with the data securing service. This is done when the principal provides a principal-supplied credential. It is noted, that this principal-supplied credential is different from the "master credential," discussed herein and below.

Continuing with the embodiment of 111 and at 112, the data securing service generates the master credential in response to the principal-supplied credential. That is, whenever a principal changes the principal-supplied credential, such as a password that is used to login to the processing environment of the data securing service, the data securing service generates a master credential. Thus, if a user were to change a login password, the data securing service also changes the master credential and re-performs the processing 110-130 of the FIG. 1.

In another embodiment, at 113, the data securing service resolves the non-contiguous data selections from the server-controlled data to produce the first and second portions in response to a predefined policy. That policy is secure and accessible to just the data securing service. Moreover, the policy may be specific to an identity associated with the principal.

In an alternative situation, at 114, the data securing service resolves the non-contiguous data selections from the server-controlled data selections to produce the first and second portions in response to a random order generation algorithm. That is, the data securing service uses a random generate to produce rules for scrambling the server-controlled data into the non-contiguous data selections. The rules are then secure and known and accessible to just the data securing service.

At 120, the data securing service encrypts the first portion using a master credential and a first identity to produce an encrypted version of the first portion of server-controlled data. This encrypted first portion is then stored or housed on a first server. So, not only is the first portion a selection of non-contiguous data from the original user-created server-controlled data, but the first portion is also encrypted via a master credential and a first server identify for the first server. Thus, even if the master credential in some way becomes compromised, the first portion cannot be decrypted unless the master credential is used with first server identity. Moreover, as discussed above, even if both the master credential and the first server identity are compromised, the decrypted data acquired would appear as gibberish because it was scrambled at 110.

In an embodiment, the master credential is a password for a server that executes the data securing service. The first and second servers are accessible and trusted or in a secure relationship with the server that executes the data securing service.

At 130, the data securing service also encrypts the second portion of the server-controlled data using the master credential and a second server identity for the second server. The encrypted second portion is then housed or stored on the second server.

At this point in time, the data securing service can reconstruct the server-controlled data under proper conditions set out herein and below for secure access to a principal. Thus, the server-controlled data can be entirely removed from the server that executes the data securing service or from a processing environment associated with data securing service.

At 140, the data securing service creates a second credential that is distributed back to the principal. The second credential identifies an order for assembling a decrypted version of the encrypted first and second portions from the first and second servers, respectively, for purposes of recreating the original server-controlled data. The second credential provides a mechanism for the data securing service to authenticate that access to the data is authenticate and verified. Once presented by an authenticated principal, the data securing service acquires the order and re-assembles the server-controlled data.

According to an embodiment, at 141, the data securing service produces the order in response to the non-contiguous data selections used to create the first and second portions.

In one case of 141 and at 142, the data securing service also encrypts the order using the second credential. Again, the second credential is different from the master credential and from the principal-supplied credential The principal-supplied credential is used to authenticate the principal for access to the data securing service. The master credential and server identities are used to encrypt and decrypt the non-contiguous data selections of the server-controlled data. The second credential is used to reconstruct the order for assembling decrypted versions of the non-contiguous data selections.

Effectively to gain access to the original server-controlled data the following has to be decrypted and assembled: "D=U1 (B1)+U2(B2)+U3(B3) . . . " B1-BN (where N is a last server used) are portions of the non-contiguous data scrambled. U1-UN (where N is a last server used) is an encrypting using the master credential (shared among the servers) and each particular server's identity. D is the sum total (including the order representing as "+" signs above). D is only provided when a principal is authenticated for access to the data securing service and also provides the second credential, which in some cases is a password phrase.

During a particular operation of data securing service, the principal is a user that authenticates for access to that user's data via the data securing service by providing a user identifier and password combination (principal-supplied credential). At this point, the data securing service (assuming the user's data (server-controlled data) has already been encrypted and stored as discussed above), requests that both the first and second servers push the encrypted first and second portions of the server-controlled data to a client machine of the user. The user is then asked to enter an additional password phrase (second credential and previous acquired by the user at 140). If this is done successfully, then the master credential and server identities are used to decrypted the first and second portions and place the first and second portions into the original order. So, the user now has access to that user's data (the original server-controlled data).

Operational aspects of the data securing service, after encrypting the portions of the server-controlled data into non-contiguous data selections, are discussed in greater detail below with reference to the method 200 of the FIG. 2.

FIG. 2 is a diagram of another method 200 for securing data access, according to an example embodiment. The method 200 (herein after referred to as "secure-data access service") is implemented in and resides within a machine-accessible and computer-readable storage medium as instructions, which when processed by a machine (one or more processors, etc.) performs the processing depicted in the FIG. 2. The secure-data access service is also operational over a communication network. The network is wired, wireless, or a combination of wired and wireless.

The secure-data access service represents processing that takes place after a principal's information or data is initially encrypted and situated or configured in the manners discussed above with the data securing service, represented by the method 100 of the FIG. 1.

At 210, the secure-data access service receives a request from a principal to access server-controlled data. Again, the configuration of this server-controlled data was provided above in detail with reference to the method 100 of the FIG. 1.

According to an embodiment, at 211, the secure-data access service authenticates the principal for initial access via a logon credential (identifier and password combination, biometrics, digital certificates, assertions, and/or etc.). Again it is to be noted that this logon credential is different from the principal-supplied credential, and the master credential (discussed below with reference to the FIG. 2.).

Also, it is to be understood that the logon credential being used with reference to the FIG. 2 is the principal-supplied credential discussed with reference to the FIG. 1. Additionally, the principal-supplied credential discussed with reference with this FIG. 2 is equivalent to the second credential discussed above with reference to the FIG. 1. The usage of the master credential is consistent in both FIGS. 1 and 2.

At 220, the secure-data access service authenticates the principal for the request via the principal-supplied credential. This usage of principal-supplied credential comports with the second credential provided to the principal at 140 of the FIG. 1.

In an embodiment, at 221, the secure-data access service acquires the principal-supplied credential as a security password phrase that was previously provided to the principal when encrypted portions of the server-controlled data were initially encrypted. Again, this was discussed with reference to the FIG. 1 as the second credential.

At 230, the secure-data access service reproduces an order for assembling the encrypted portions of the server-controlled data located on a first server and a second server. Each encrypted portion representing non-contiguous data selections from the server-controlled data.

In an embodiment, at 231, the secure-data access service decrypts an encrypted version of the order using the principal-supplied credential (discussed as the second credential with reference to the FIG. 1).

In another case, at 232, the secure-data access service acquires the order from a third server after authenticating that the principal-supplied credential is legitimate and verified.

It is also noted that for purposes of illustration and ease of comprehension that just two encrypted portions of the server-controlled data and just two servers (first and second) were discussed. The embodiments herein are not so limited. That is, any desired number of servers can be used, each having a different and unique encrypted portion of the server-controlled data and each encrypted portion representing non-contiguous data selections from the original server-controlled data.

So, in an embodiment, at 233, the secure-data access service assembles the encrypted portions from the first, second, and three or more additional servers.

At 240, the secure-data access service decrypts the encrypted portions using a master credential and a first server identity for the first server and a second server identity for the second server to produce decrypted portions of the server controlled data. The decrypted portions are still scrambled at this point in time and useless to any rogue intruder.

In a continuation of the embodiment of 233 and at 241, the secure-data access service decrypts a number of the encrypted portions from the three or more additional servers using the master credential and additional server identities for each of the three or more additional servers.

At 250, the secure-data access service assembles the decrypted portions of the server-controlled data in the order reproduced at 230. This reproduces the original server controlled data.

At 260, the secure-data access service provides the principal with access to the reproduced server-controlled data. That is, the reproduced server-controlled data is loaded into the client or a processing environment for which the principal can gain access to it.

FIG. 3 is a diagram of a data access security system 300, according to an example embodiment. The data access security system 300 is implemented as instructions on one or more processing devices. These processing devices specifically configured to process the data access security system 300. The data access security system 300 is also operational over a communication network. The communication network is wired, wireless, or a combination of wired and wireless.

In an embodiment, the data access security system 300 implements, among other things, the methods 100 and 200 of the FIGS. 1 and 2, respectively.

The data access security system 300 includes a master credential service 301, an encryption service 302, and a decryption service 303. Each of these and their interactions with one another are now discussed in turn.

The master credential service 301 is implemented in a computer-readable storage medium and executes on the one or more processing devices. Example processing associated with the master credential service 301 was discussed in detail above with reference to the method 100 of the FIG. 1.

The master credential service 301 is configured to generate a master credential. The creation and usage of the master credential was discussed above with reference to the methods 100 and 200 of the FIGS. 1 and 2.

According to an embodiment, the master credential service 301 is configured to generate the master credential in response to a logon credential supplied to authenticate the principal for initial access to the data access security system 300. Also, the master credential and the logon credential are different from one another.

Continuing with the last embodiment, the principal-supplied credential (discussed below and the usage of which is consistent with that which was provided in the discussion associated with the FIG. 2) is different from the master credential and the logon credential.

The encryption service 302 is implemented in a computer-readable storage medium and is to execute on the one or more processing devices. Example aspects of the processing associated with the encryption service 302 was discussed in detail above with reference to the method 100 of the FIG. 1.

The encryption service 302 is configured to encrypt multiple portions of server-controlled data where each portion represents non-contiguous data selections from that server-controlled data. Furthermore, each encrypted portion of the server-controlled data is stored on a different server over a network. Additionally, each portion is encrypted using the master credential and a specific server identity for a particular server that the portion being encrypted is to be stored on.

The encryption service 302 acquires the master credential from the master credential service 301.

Also, the encryption service 302 generates an order for reconstructing decrypted portions of the encrypted portions. A principal-supplied credential is supplied to a principal that owns the server-controlled data and that principal-supplied credential used by the decryption service 303 to reproduce the order.

According to an embodiment, the order is a rule that is specific to the server-controlled data. In some cases, the rule is supplied when the principal initially requests that the server-controlled data be secured and encrypted. That is, the principal supplies the rule for producing the order.

In another case, the order is randomly generated for the server controlled data.

The decryption service 303 is implemented in a computer-readable storage medium and executes on the one or more processing devices. Example processing associated with the decryption service 303 was discussed in detail above with reference to the method 200 of the FIG. 2.

The decryption service 303 is configured to authenticate a principal-supplied credential (consistent with the usage provided in the FIG. 2 discussion). The principal provides the principal-supplied credential.

This principal-supplied credential is used by the decryption service 303 to reproduce the order for assembling decrypted versions of the encrypted versions of the server-controlled data into the original server-controlled data. Each encrypted version is acquired from the proper server by the decryption service 303 and decrypted using the master credential and that particular server's identity. Once each of the decrypted versions is acquired the order is assembled and the original server controlled data reproduced for the principal to access.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a processor, the method comprising:
segmenting server-controlled data for a principal into a first portion for a first server and a second portion for a second server, each of the first and second portions represents non-contiguous data selections from the server-controlled data, the first portion and the second portion each represents scrambled portions of the server-controlled data that is mixed up from a normal created order for the server-controlled data, both the first portion and the second portion have a random ordering of the server-controlled data;
encrypting the first portion using a master credential and a first server identity for the first server to produce an encrypted first portion and then housing the first portion on the first server;
encrypting the second portion using the master credential and a second server identity for the second server to produce an encrypted second portion and then housing the second portion on the second server; and
creating a second credential that is distributed to the principal, the second credential identifying an order for assembling a decrypted version of the encrypted first portion from the first server with a decrypted version of the encrypted second portion from the second server for purposes of recreating the server-controlled data, and recreating the server-controlled data when the principal provides the second credential having the order.

2. The method of claim 1, wherein segmenting further includes authenticating the principal for initial access via a principal-supplied credential that is different from the master credential.

3. The method of claim 2, wherein authenticating further includes generating the master credential in response to principal-supplied credential.

4. The method of claim 1, wherein segmenting further includes resolving the non-contiguous data selections from the server-controlled data to produce the first and second portions in response to a policy.

5. The method of claim 1, wherein segmenting further includes resolving the non-contiguous data selections from the server-controlled data to produce the first and second portions in response to a random order generation algorithm.

6. The method of claim 1, wherein creating further includes producing the order in response to the non-contiguous data selections used to create the first portion and the second portion.

7. The method of claim 6, wherein producing the order further includes encrypting the order using the second credential, the second credential different than the master credential and different from a principal-supplied credential used to initially authenticate the principal for access.

8. A processor-implemented method to execute on a processor, the method comprising:
receiving a request from a principal to access server-controlled data;
authenticating the principal via a principal-supplied credential that is provided by the principal and obtaining an order from the principal-supplied credential;
reproducing the order for assembling encrypted portions of the server-controlled data located on a first server and a second server, each encrypted portion representing non-contiguous data selections from the server-controlled data wherein each encrypted portion is scrambled in a different order from a normal created order, and each encrypted portion includes a random ordering;

decrypting the encrypted portions using a master credential and a first server identity for the first server and a second server identity for the second server to produce decrypted portions of the server-controlled data;

assembling the decrypted portions in the order to reproduce the server-controlled data; and providing the principal access to the reproduced server-controlled data.

9. The method of claim 8, wherein receiving further includes authenticating the principal for initial access via a logon credential, the logon credential, the principal-supplied credential, and the master credential are all different from one another.

10. The method of claim 8, wherein authenticating further includes acquiring the principal-supplied credential from the principal as a security phrase previously provided to the principal when the encrypted portions were initially encrypted.

11. A data access security system implemented on a processing device, comprising:

a master credential service implemented in a computer-readable medium and to execute on the processing device; and a encryption service implemented in a computer-readable medium and to execute on the processing device; and a decryption service implemented in a computer-readable medium and to execute on the processing device;

the master credential service configured to generate a master credential, the encryption service configured to encrypted multiple portions of server-controlled data, each portion representing non-contiguous data selections from the server-controlled data, and each portion stored on a different server of a network, wherein each portion is scrambled in a different order from a normal created order, and each different order is a random order, and each portion also encrypted using the master credential and a specific server identity for a particular server that the portion being encrypted is to be stored on, the decryption service configured to authenticate a principal-supplied credential received from a principal, the principal-supplied credential used to produce an order for assembling decrypted versions of the encrypted portions acquired from the different servers of the network, and the decryption service configured to assemble the decrypted versions into the order to reproduce the server-controlled data for the principal to access when the principal-supplied credential is provided by the principal.

12. The system of claim 11, wherein the master credential service is configured to generate the master credential in response to a logon credential supplied to authenticate the principal for initial access, the master credential and the logon credential different from one another.

13. The system of claim 12, wherein the principal-supplied credential is different from the master credential and the logon credential.

14. The system of claim 11, wherein the order is a rule that is specific to the server-controlled data.

15. The system of claim 14, wherein the rule is principal-supplied when the principal initially requests that the server-controlled data be encrypted.

16. The system of claim 14, wherein the rule is randomly generated for the server-controlled data.

* * * * *